United States Patent [19]
Landt et al.

[11] Patent Number: 4,888,591
[45] Date of Patent: Dec. 19, 1989

[54] SIGNAL DISCRIMINATION SYSTEM

[75] Inventors: Jeremy A. Landt, Los Alamos; Alfred R. Koelle, Santa Fe; David A. Eckhardt, Albuquerque, all of N. Mex.

[73] Assignee: Amtech Technology Corporation, Santa Fe, N. Mex.

[21] Appl. No.: 254,254

[22] Filed: Oct. 6, 1988

[51] Int. Cl.$^4$ ............................................. G01S 13/80
[52] U.S. Cl. ......................................................... 342/44
[58] Field of Search ............................. 342/44, 42, 51

[56] References Cited

U.S. PATENT DOCUMENTS

| | | | |
|---|---|---|---|
| 3,964,024 | 6/1976 | Hutton et al. | 342/44 |
| 3,984,835 | 10/1976 | Kaplan et al. | 342/44 |
| 4,042,906 | 8/1977 | Ezell | 342/50 |
| 4,086,504 | 4/1978 | Ezell et al. | 342/50 |
| 4,218,680 | 8/1980 | Kennedy | 342/44 |
| 4,370,653 | 1/1983 | Crowley | 342/42 |
| 4,641,374 | 2/1987 | Oyama | 342/51 |
| 4,739,328 | 4/1988 | Koelle et al. | 342/44 |
| 4,740,792 | 4/1988 | Sagey et al. | 342/50 |

Primary Examiner—Nelson Moskowitz
Assistant Examiner—John B. Sotomayor
Attorney, Agent, or Firm—Blakely, Sokoloff, Taylor & Zafman

[57] ABSTRACT

The invention provides a system for discriminating between modulated backscattered signals based upon transmission-to-reception time delay. The system employs a carrier, phase-modulated with a modulating signal, having characteristics which provide unity output when correlated with itself with zero time shift and a substantially lower output level when correlated with itself with a significant time shift. The system works with a backscatter-modulator located a finite distance from the transmitter for receiving and modulating the backscatter of the carrier. A receiver/detector receives and detects the modulated backscattered phase-modulated signal, the detector being phase-sensitive and having as a reference signal the transmitted phase-modulating carrier signal, and having as an input signal the phase modulated backscattered carrier. The detector provides an output signal whose averaged amplitude is substantially dependent upon the degree of phase correlation between the phase of the modulation returned input signal and the reference signal. Finally, the output signal from the detector is selectively processed only when its averaged amplitude is above a threshold level. In a preferred embodiment, the transmitted signal is a spread spectrum signal.

10 Claims, 4 Drawing Sheets

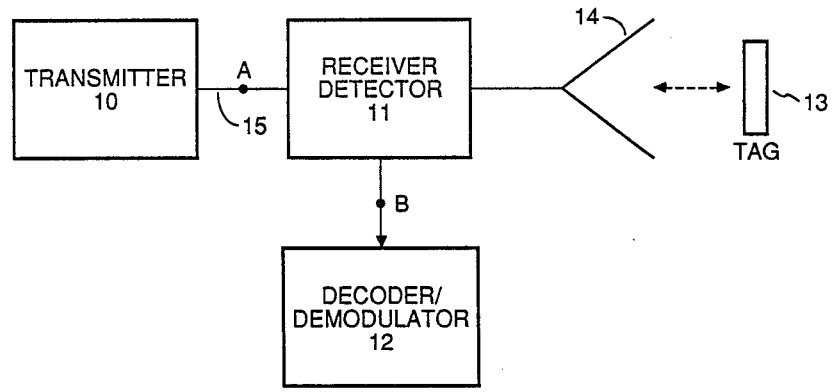
FIGURE 1
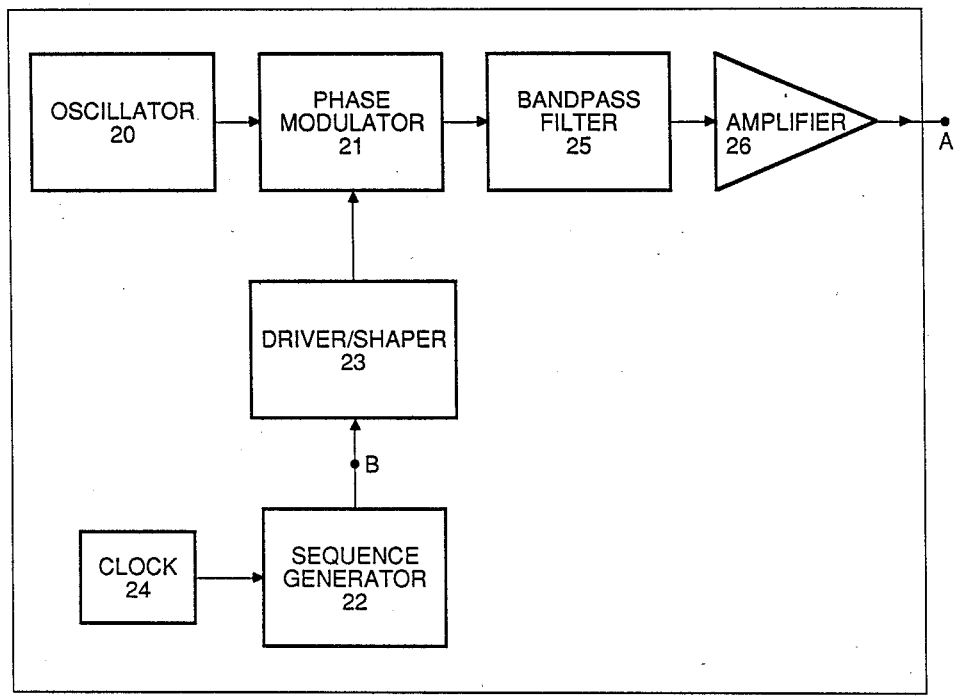
FIGURE 2. TRANSMITTER 10

SIGNAL DISCRIMINATION SYSTEM

BACKGROUND OF THE INVENTION AND PRIOR ART

This invention can be used in field of remote identification of objects, principally moving objects. For example, shipping containers, railroad cars and automobiles need to be identified while they are in use, often while moving. Systems useful for remote identification using active or passive "tags" which backscatter-modulate a continuous wave, r.f. transmitted signal with a digital identification code have been described in U.S. Pat. No. 4,739,328 and U.S. Pat. Application Ser. No. 885,250, filed July 14, 1986, assigned to the same assignee as this invention. The backscatter-modulated signal is received, usually by the same system which transmitted the original signal, and the digital code is demodulated and decoded, providing identity information of the tagged object, or other information which may be desired.

In many applications of these systems, there are several tagged objects near each other. Each of these tags has the capability of backscatter-modulating the transmitted signal. Often some of these objects are the ones from a desired signal, and others are not. A good example of this is in toll road toll collection lanes. A separate "reader", i.e., a transmitter-receiver, is normally used for each lane. Alternatively, a single transmitter-receiver transmitting multiple, different signals may be used, having separate transmitting and receiving antennas for each lane. The lane-specific antenna or transmitter-receiver must be capable of discriminating between the desired, returned signal from the correct tag after backscatter modulation, and a similar signal which may be returned from a tag on a car in a different lane for which this particular transmitter-receiver or antenna is not intended.

In the past, many different techniques for discrimination have been employed. Antenna location and orientation has been carefully chosen to maximize the amplitude of the return signal from the desired tag location. For example, antennas can be spaced far enough apart to avoid interference. In addition, the receiver sensitivity can be selected to maximize the reception from the desired tag reading area and minimize it from other areas. Various shielding techniques also have been used.

Shielding is an erratic solution because unpredictable signal reflection can elude a shield or deflect a desired signal in an unexpected manner, confusing the signals at the reader. Antenna location and orientation is not always suitable since structures such as toll booths, lane barriers and the like often interfere with ideal locations and spacing of antennas. Morever, the transmitted signals are often not narrow and well defined, making precise control difficult. Adjusting receiver sensitivity is also sometimes erratic because reflected signals can combine with the original or other reflected signals, resulting in an unpredictable amplification of the received signal which fools even the adjusted receiver.

What is desired is to have something in the transmitted signal itself which renders it capable of being discriminated, in its backscatter-modulated form, from other backscatter-modulated return signals from other tags even though all the tags backscatter-modulate the transmitted signal in precisely the same manner.

BRIEF DESCRIPTION OF THE INVENTION

The system of the invention provides a technique and apparatus for discriminating between backscatter-modulated signals based upon the total transmission-to-reception time delay. Unexpectedly, it was discovered that if the transmitted carrier signal were phase-modulated with a modulating signal having characteristics which provide unity output when correlated with itself with zero time shift, and a substantially lower output level when correlated with itself with a significant time shift, adequate discrimination can be achieved. Such a phase-modulated carrier signal is sometimes called a direct spread spectrum signal. Phase modulation with a modulating signal, which may, for example, be a pseudo-random sequence, produces a double-sideband, suppressed carrier signal. Such spread spectrum signals have an additional advantage in that their transmitters are more readily licensed by the Federal Communications Commission than continuous wave transmitters.

The system of the invention includes a means for phase modulating the carrier with a modulating signal having the desired characteristics. The system also includes a transmitter for transmitting the phase-modulated carrier signal. A backscatter modulating means located a finite distance from the transmitter receives, modulates and backscatters the phase-modulated carrier signal. Preferably this backscatter modulation is an amplitude modulation (AM), but it is additionally possible to phase-modulate the RF. The modulated backscattered phase-modulated carrier signal is received back at a receiver-detector, often located together with the transmitter. The receiver-detector, which is RF carrier-phase-sensitive, has as its input signal the modulated, backscattered phase-modulated carrier signal, and as its reference signal, the transmitted phase-modulated carrier signal. This reference signal is readily available where the transmitter and receiver are part of the same system in the same location. The detector provides an output signal whose averaged amplitude is substantially dependent upon the degree of carrier phase correlation between the input signal and the reference signal.

The output signal from the receiver-detector is processed in order to retrieve the information contained in the tag and which was contained in the modulated backscattered return signal only when its average amplitude is above a threshold value. Since the correlation between the returned signal and the reference signal is highest when the backscatter is from a predetermined, desired tag rather than from another tag at another location a different distance from the receiver, the averaged amplitude of the output signal from the detector will be significantly higher from a desired return signal as opposed to an undesired one. It is therefore an easy matter to process only output signals from the detector above a threshold amplitude.

In a preferred embodiment of the invention, the phase modulation at the transmitter is biphase and the phase-modulating signal is a sequence of pseudo-random digital pulses which, for example, can be generated by a shift register circuit.

DESCRIPTION OF THE DRAWINGS

FIG. 1 is a block diagram of the system of the invention.

FIG. 2 is a block diagram of the transmitter of the invention.

DETAILED DESCRIPTION OF PREFERRED EMBODIMENTS OF THE INVENTION

Figure 3:
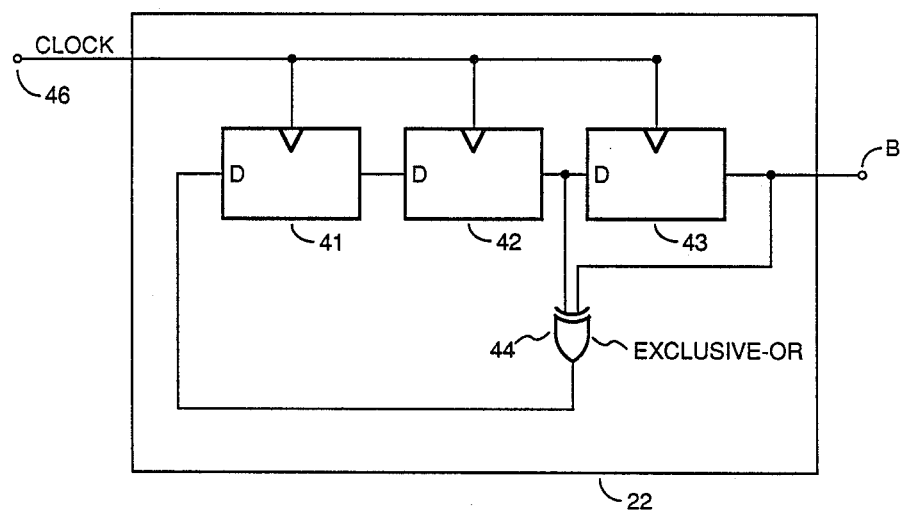
FIG. 3 is a logic diagram of a shift register used to generate the pseudo-random pulse sequence of a preferred embodiment of the invention.

The detailed description which follows, making reference to the drawings, describes preferred embodiments of the invention. It will be appreciated by those skilled in the art that many modifications may be made in these preferred embodiments, only some of which may be generally described, without departing from the general nature of the claimed invention.

The essential elements of the invention shown in FIG. 1 include transmitter 10, receiver/detector 11, decoder 12 and tag 13. Transmitter 10 sends the phase-modulated carrier through receiver/detector 11 to antenna 14, which in turn is transmitted by antenna 14 to tag 13. Tag 13, which is the backscatter modulating means of the invention to be described later, is located a finite distance from the transmitter 10 and receives and modulates the backscatter of the transmitted phase-modulated carrier signal. The modulated backscattered signal is returned to antenna 14 and then on to receiver/detector 11, where it is received and compared in the detector to a reference signal. The reference signal is the same as the transmitted, phase-modulated carrier signal coupled to receiver 11 through line 15 at node A. Receiver/detector 11 provides an output signal at node B, which is passed to decoder/demodulator 12, whose averaged amplitude output is substantially dependent upon the degree of phase correlation in the detector between the received, modulated backscattered signal and the reference signal. Decoder/demodulator 12 is capable of selectively processing input signals which have an averaged amplitude above a threshold level, as will be explained below.

The transmitter of the invention is shown in FIG. 2. In the illustrated preferred embodiment, transmitter 10 includes a 915 MHz oscillator 20 which provides the carrier signal. 915 MHz was chosen because it is available and licensable for various industrial applications in the U.S., including automatic vehicle monitoring systems, by the Federal Communications Commission. The carrier signal from oscillator 20 is passed to phase modulator 21 to modulate it with a modulating signal having characteristics which provide unity output when correlated with itself with zero time shift, and a substantially lower output level when correlated with itself with significant time shift. For example, random and pseudo-random modulating signals have these characteristics. Such a signal could be generated, for example, by a stationary stochastic process. In this embodiment, the modulating signal is binary, employing a pseudo-random pulse sequence. As will be described in more detail later, this pulse sequence is supplied by sequence generator 22 through driver-shaper 23. Driver-shaper 23 rounds the edges of the pulses to improve their shape for easier modulation onto the carrier. The sequence generator 22 is timed by shift clock generator 24.

The modulated output signal from phase modulator 21 is sometimes referred to as a direct spread spectrum signal. Phase modulator 21 produces a double-sideband, suppressed carrier signal which is passed to a bandpass filter 25, which limits the spectrum to that permitted by regulation. Amplifier 26 amplifies the signal to be transmitted to raise it to the desired power level needed for transmission.

Where the modulation signal produced by sequence generator 22 is a pseudo-random signal, a shift register type generator 22 may be employed, as shown in FIG. 3. In this example, a three-stage shift register 22 is used, including D-flip-flops 41, 42 and 43 connected, as shown, with an exclusive-or gate 44 which has its inputs derived from the outputs of D-flip-flops 42 and 43 and has its output tied back to the "D" input of D-flip-flop 41. The pseudo-random output code sequence at node B is connected to driver/shaper 23, as shown in FIG. 2. The clock signal from clock generator 24, shown in FIG. 2, is inputted at terminal 46, shown in FIG. 3. Three register stages are illustrated for simplicity. Three stages provides a sufficiently high repeat cycle frequency, repeating every seven clock cycles. If clocked at a rate of 10 MHz, this frequency is usually sufficiently high so as to be free of conflict with the backscatter-modulated return signals, which usually have a much lower frequency, for example, 20 and 40 kHz.

Using additional shift register stages, which produce a longer repeat sequence of the pseudo-random modulation signal, provides even better correlation differentiation. This means that the amplitude differences between correlated return signals, which are closer to the reference, and less correlated ones, which are usually the ones to be eliminated, are greater, enabling unwanted signals more readily to be distinguished. Shift register sequences usable in this invention have been described in *Shift Register Sequences*, Solomon W. Golomb, Holden-Day, Inc. (1957), Chapter 3.

Figure 4:
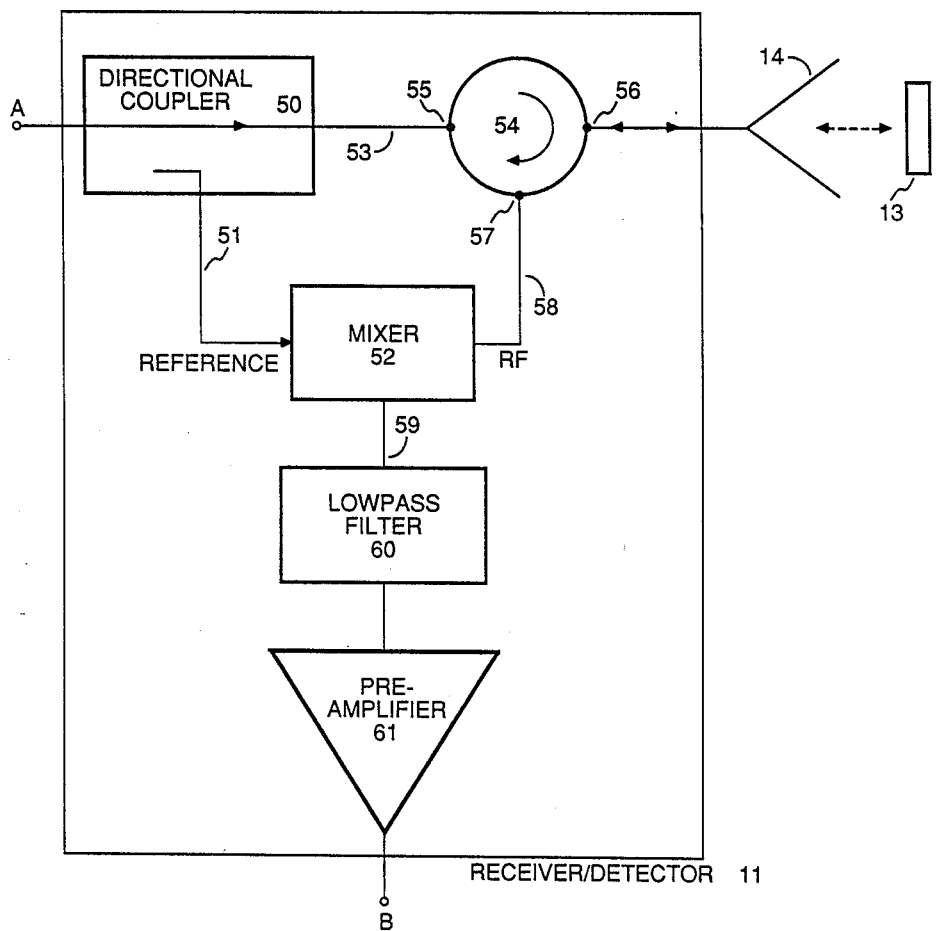
FIG. 4 is a block diagram of the receiver-detector of the invention.

The receiver/detector of this invention is shown in FIG. 4. As shown in FIGS. 1 and 4, the transmitter is coupled into the receiver at node A. Referring to FIG. 4, the transmitter signal at node A is passed through directional coupler 50, which pulls off a portion of the signal as the reference signal and couples it through line 51 into the reference input of mixer 52. The main portion of the signal is passed through line 53 into circulator 54. Circulator 54 is a conventional, unidirectional signal circulator adapted to operate at the frequency of the transmitted signals used in this invention. The main output signal from directional coupler 50 is passed into port 55 of circulator 54, and passed out of port 56 to the antenna 14, where it is sent to the tag for backscattering. The modulated backscattered signal from antenna 14 comes back into port 56, and is passed through port 57 and line 58 to the RF input of mixer 52.

Circulator 54 is a conventional, high frequency circulator which passes signals only in one direction, clockwise in the example illustrated, from one of ports 55, 56 or 57, to the next. Thus signals from directional coupler 50 into port 55 are passed to port 56 and out onto antenna 14. Backscatter- modulated signals received by antenna 14 from the tag 13 are passed into circulator 54 through port 56. These signals are then circulated from port 56 to port 57 and onto mixer 52 through line 58.

Mixer 52 compares the reference signal on line 51 from directional coupler 50 with the returned signal on line 58 from port 57 of circulator 54. Preferably, mixer 52 is a double-balanced mixer used as a phase comparator. Mixer 52 compares the phases (typically 0 degrees or 180 degrees) of its two input signals from lines 51 and 58. The output signal from mixer 52 is passed through line 59 and lowpass filter 60 to preamplifier 61, whose output appears at node B of receiver/detector 11, shown in FIGS. 1 and 4.

Mixer 52 is a conventional double-balanced mixer which may, for example, be obtained from Mini-Circuits, P.0. Box 166, Brooklyn, N.Y. 11235. The mixer is switched by the reference signal on line 51. When the reference signal is a predetermined polarity, usually positive, the modulated backscattered signal on line 58 passes directly through the mixer to line 59. When the reference signal is the opposite polarity, typically negative, the modulated backscattered signal is inverted.

From mixer 52, the signal passes through line 59 to lowpass filter 60. Lowpass filter 60 serves to average the amplitude of the output signals from the mixer. This averaging, as will be explained below in connection with the graph of FIG. 5, results in a signal having a relatively low amplitude where the reference and the returned signals are out of macro phase, and a high amplitude where they are in macro phase of the phase modulation signal.

The instantaneous amplitude of the IF output signal on line 59 from mixer 52 depends primarily upon two factors: (1) the amplitude of the RF input signal on line 58; and (2) the cosine of the relative phase angle between the reference signal on line 51 and the RF signal on line 58. It is this cosine relationship upon which the apparatus of the invention depends. The detailed operation of mixer 52 will be better understood in connection with the signal graphs shown in FIG. 5.

Figure 5:
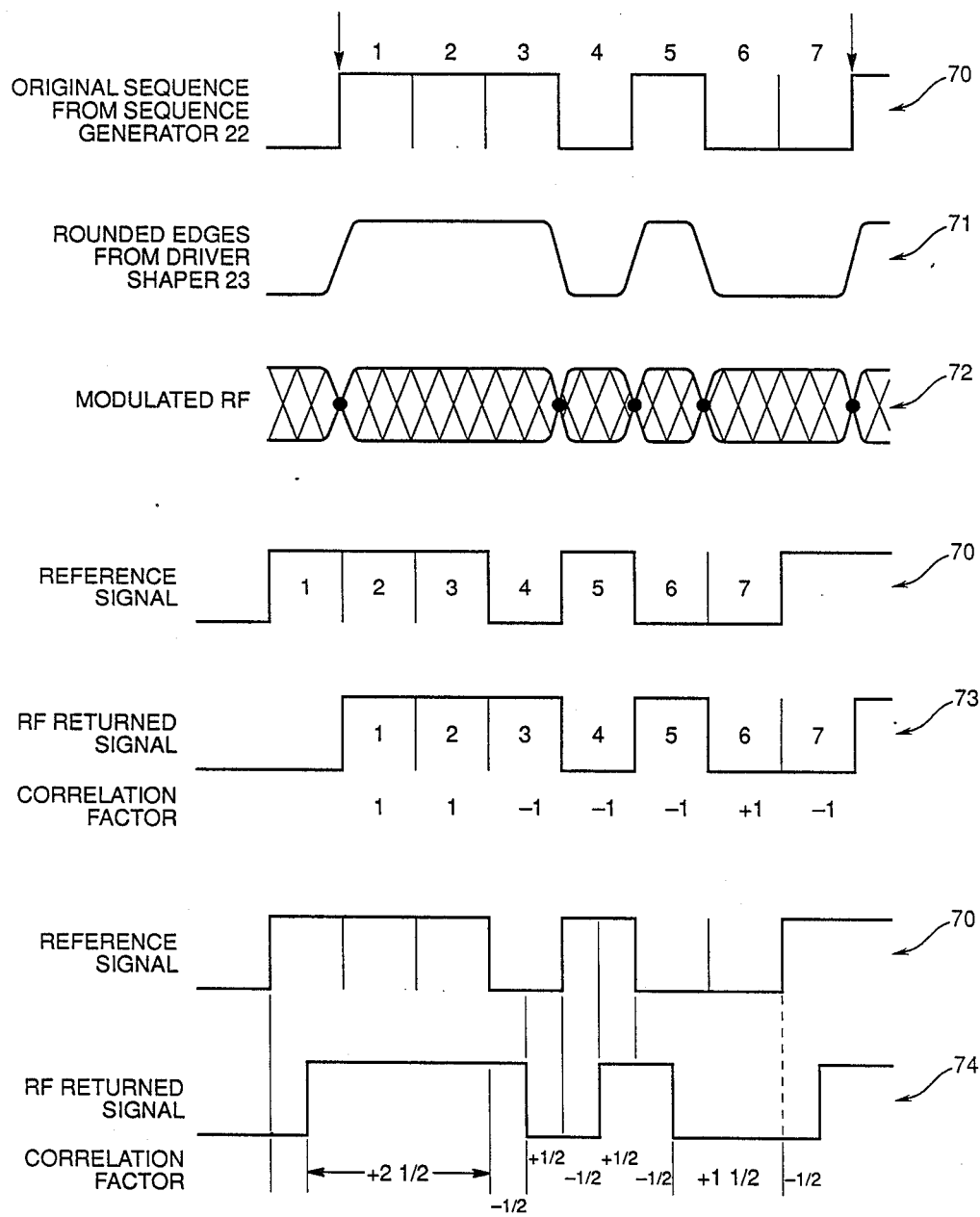
FIG. 5 is a series of timing diagrams illustrating the operation of the invention.

Referring now to FIGS. 2, 4 and 5, pulse sequence 70 shown on FIG. 5 is the sequence generated by sequence generator 22 (FIG. 2) and passed to driver/shaper 23 (FIG. 2). Driver/shaper 23 rounds the edges of the pulse sequence 70 so it appears as shown in sequence 71 on FIG. 5. The rounded signal from driver/shaper 23 is passed to phase modulator 21 and through bandpass filter 25, where it emerges as a sausage-shaped signal 72 shown on FIG. 5. Signal sequence 72 is amplified and transmitted through antenna 14 to tag 13 (FIG. 4), where it is backscatter-modulated and returned through antenna 14 to input 56 of circulator 54.

It must be understood, in actuality, that two kinds of phase changes occur to the modulated backscattered signal of the invention. There is a micro-phase change which is the shift in the modulated backscattered signal, containing the necessary data (that signal is illustrated as a cross-hatching within the sausage-like envelopes shown as signal 72 in FIG. 5). These micro-changes are an undesired side effect in signal decoding, and are readily dealt with in systems of the prior art such as those described in U.S. Pat. No. 4,739,328 and U.S. Pat. Application Ser. No. 885,250, both mentioned earlier. The phase change used in this invention is the macro-phase change wherein the entire sausage (i.e., the envelope) of signal 72 shifts its phase at the point where the dots are shown between the sausage links, as will be explained below.

The general appearance of the returned signal remains as shown in waveform 72 in FIG. 5, but the amplitude will change slightly in accordance with the backscatter-modulation, and the overall macro-phase (the envelope) will shift during the transmission to and from the tag. The invention takes advantage of this macro-phase shift. This phase relationship can best be illustrated using square waves. The original reference signal is illustrated in FIG. 5 as square wave 70. The macro-phase modulation on the returned RF signal on line 58 is illustrated on FIG. 5 as square wave 73. Comparing the actual reference signal 72 to the illustrative square wave signal 70 shows that the dots at the axis of signal 72 correspond to macro-shifts in phase from high-to-low and low-to-high of the reference signal 70, corresponding to 180 degree phase shifts of the RF signal. For the purposes of illustration, it is assumed that during signal transmission to the tag and return, the frequency of the reference signal was shifted by the width of one pulse of the modulating signal.

The operation of mixer 52 is such that if the reference sample on line 51 and the RF sample on line 58 are perfectly in phase-modulating phase, the maximum output signal amplitude from mixer 52 on line 60 will be obtained. Thus if the reference and returned RF signals are both positive, the output signal is positive; if they are both negative, the output signal is also positive; and if one is positive and the other negative, the output signal is negative.

For illustration, let us assume that the returned RF signal 73 is shifted in phase from the reference signal, as shown, by one complete pulse width. The pulses of reference signal 70 have been numbered from 1 to 7. Similarly, the pulses of the returned RF signal 73 have been numbered from 1 to 7. Looking at pulse 1 of returned signal 23, which is a HIGH, and comparing it with the pulse 2, the coincident pulse in time of the reference signal 70, both pulses are high, providing a correlation of +1, shown beneath pulse 1 of waveform 73. Pulse 2 of waveform 73 also correlates exactly with coincident pulse 3 of the reference stream 70, and a correlation of +1 is shown below for that pulse as well. Pulses 3, 4 and 5 of the returned stream do not correlate, each resulting in correlations of −1, as shown. Pulse 6 of RF return signal 73 does correlate with pulse 7 of the reference signal, producing a correlation of 1, but pulse 7 does not, again producing a correlation of −1. Adding the correlation factors of the seven pulses of the returned signal 73, the sum is −1. Since there were seven pulses, the averaged correlation is −1/7.

Next, assume that the returned signal was shifted by only one-half pulse width rather than a whole one, as illustrated by returned signal 74. It is clear that the first two and one-half pulses of returned RF signal 74 correlate with the coincident pulses of reference signal 70, as shown, providing a correlation factor of +2½. The next one-half pulse of returned stream 74 does not correlate, producing a −½ correlation. The next one-half pulse does correlate; the next one-half does not; the next one-half does; and the next one-half does not, netting for the total of the two full pulse durations a correlation factor of zero. The next one and one-half pulses correspond, for a correlation factor of +1½, and the last one-half pulse does not correspond, for a −½. The sum of these correlation factors is 3 which, averaged for 7 pulses, is an averaged correlation of 3/7.

Referring to FIGS. 4 and 5, the correlation between the returned RF signal on line 58 and the reference signal on line 51 controls the averaged amplitude of the signal on line 59 from mixer 52. It will be apparent that a returned signal which correlates as poorly as signal 73 does to reference signal 70 will produce an output signal from mixer 52 having an averaged amplitude 1/7 the averaged amplitude of a signal which correlates 100%. Returned signal 74, which was shifted only by one-half pulse width from reference signal 70, produced an averaged correlation of 3/7, meaning that the output amplitude of that returned signal from mixer 52 on line 59 would be about half the amplitude of a fully correlated signal. Similarly, the output amplitude of signal 73, shifted from the reference signal 70 by a full pulse width, has a level only 1/7 of that of a fully in-phase returned signal.

The output signal from mixer 52 on line 60 is passed to a preamplifier 61, producing a preamplified signal at node B shown in FIG. 4 whose amplitude is dependent on the phase correlation in mixer 52 in accordance with this invention.

Referring now to FIG. 1, the demodulated signal at node B passes to decoder/demodulator 12. Decoder/demodulator 12 demodulates and decodes the signal to extract the binary code which was modulated onto the returned, modulated backscattered signal by tag 13. The decoding and demodulating process and the apparatus for accomplishing it are fully described in U.S. Pat. No. 4,739,328, assigned to same assignee as the subject invention.

As a result of the operation of receiver/detector 11 described above, the amplitude of the output signal passing through node B to decoder/demodulator 12 varies significantly depending upon the degree of correlation between the phase modulation pattern on the reference signal from transmitter 10 and the modulated backscattered signal from the tag 13. As explained above in connection with the graphs in FIG. 5, the amplitude of this output signal is substantially lower, by a factor of two or more, if the phase correlation between these two signals is poor, and substantially higher if the correlation is good. Where the correlation is poor, the input signal at node B to decoder/demodulator 12 is of a sufficiently low amplitude below the decoder/demodulator sensitivity, and is thus ignored. Where the correlation is good, the amplitude is sufficiently high so that decoder/demodulator 12 can decode the signal and reproduce the original binary bit pattern modulated onto the returned signal by the tag.

Figure 6:
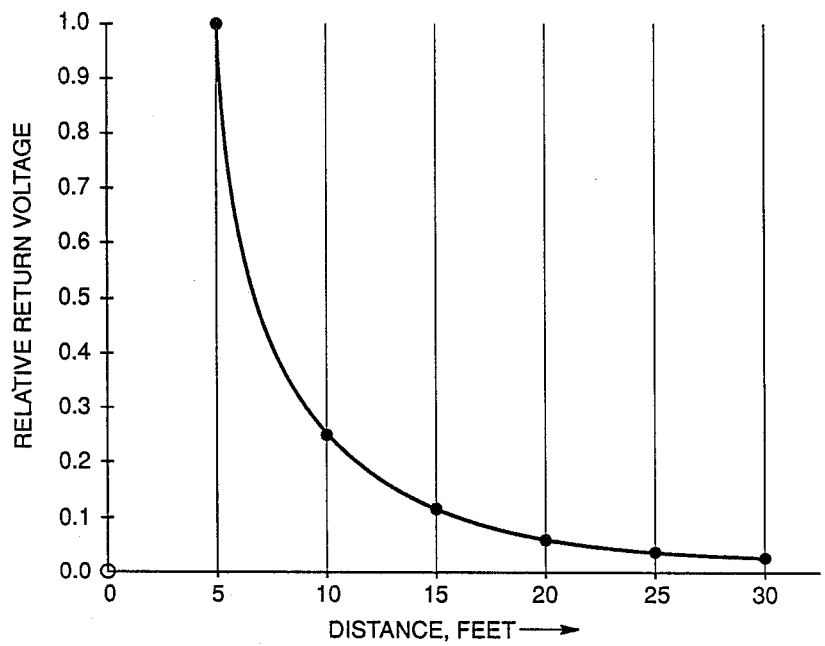
FIG. 6 is a graph depicting changes in signal amplitude response at the receiver with variations in the distance between a tag and the transmitter in a system of the prior art.
Figure 7:
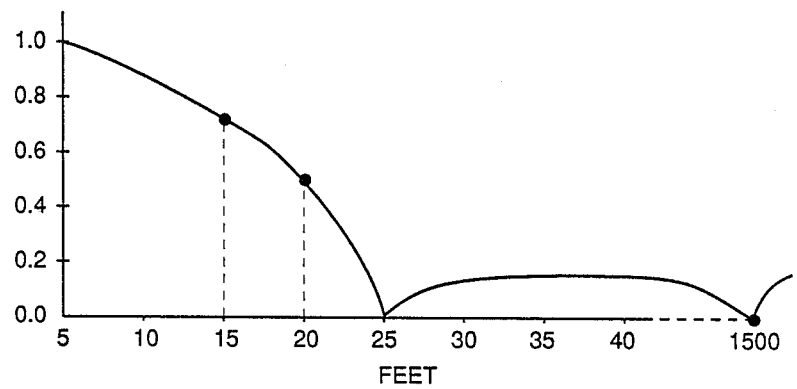
FIG. 7 is a graph depicting an example of changes in averaged amplitude response at the receiver with variations in the distance between a tag and the transmitter.

The graphs of FIGS. 6 and 7 illustrate the advantages obtained by the system of this invention over the prior art. The first portion of the curve on FIG. 7 for a distance between 5 and 25 feet shows the usual falloff of signal strength obtained with a system of the prior art without using the spread spectrum signal modulation according to the invention. The curve has been normalized to show a maximum signal strength of 1.0 at 5 feet from the antenna. Note in this first portion of the curve in FIG. 7 that the falloff in signal strength at 15 feet is about 70%, and the falloff at 25 feet is almost complete. Accordingly, using the system of the prior art, it would be very difficult to discriminate, based upon this small amplitude differential in signal (30%), between a proper signal generated 15 feet away from the antenna and a spurious one from 25 feet away.

The graph of FIG. 7 ignores the normal signal decay with distance shown in FIG. 6, and only takes into consideration the falloff in signal strength with distance based upon the modulation technique used in the subject invention. At 25 feet, the lack of correlation shown by the significant drop in signal level results from the principles of the invention. The signal strength falls almost to 0. It turns out that there is a null point at 25 feet, but even well beyond 25 feet, up to about 1,500 feet for a 915 Mhz carrier, the signal strength increases only a small amount, well below 10%. At about 37 feet, for example, the signal level is 1/7, or 0.15, as described earlier and shown in FIG. 7, due to lack of correlation. Accordingly, it is very easy to discriminate, using the apparatus of the invention, between a desired signal 15 feet from the reader, and an unwanted signal, such as from an adjacent toll lane, which in most cases will be at least 25 feet away.

It is possible to tailor the distances in actual set up very accurately by locating the antenna at the desired distance from the tag even though the transmitter, receiver/detector and decoder are located somewhere else. They may be connected by shielded cable. The antenna is the only component of the system whose location is critical.

Figure 8:
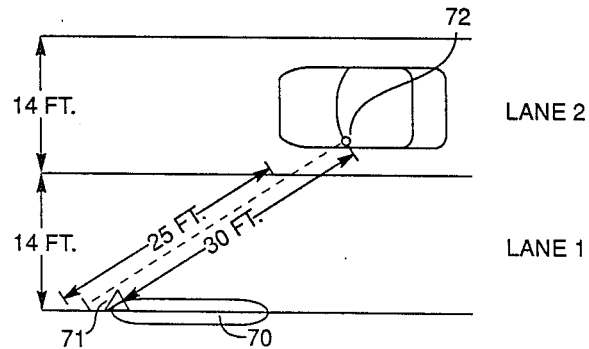
FIG. 8 is a diagram of two toll lanes illustrating the benefits of the system of this invention.

The operation of the apparatus of this invention in toll lanes is illustrated in FIG. 8. The apparatus of the invention 70 has its antenna 71 located adjacent LANE 1 of the toll lane, as shown. No matter where the automobile being monitored in LANE 1 appears, and no matter where the tag is placed on the automobile, the antenna is directed so the reading of the tag will take place within a maximum of 15 feet of the antenna 71. Assuming the antenna is aimed at the angle shown in FIG. 8, the tag 72 on the automobile in LANE 2 will never be closer than about 25 feet from the antenna. Accordingly, the signal sent back from that tag will be significantly smaller than the signal from any vehicle in LANE 1, as shown in the graph of FIG. 7 for 25 feet and 15 feet, respectively. Therefore, the signal from the adjacent vehicle in LANE 2 will be well below the sensitivity level of the decoder/demodulator in apparatus of this invention used to extract the vehicle identification in accordance with this invention. Vehicles in LANE 1, however, will have almost a maximum signal strength which will be decoded very easily.

It will be apparent to those skilled in the art that numerous changes may be made in all aspects of the invention, including the nature and length of the random sequence, the frequencies of modulation, and the various types of equipment which may be used to build the apparatus described, without departing from the spirit and scope of the invention, as set forth in the claims which follow.

We claim:

1. A system for preferentially receiving modulated backscattered signals based upon a phase shift of the modulation of the phase-modulated carrier signal resulting from the transmission-to-reception time delay, comprising:

a means for phase modulating a carrier with a modulating signal having characteristics which provide unity output when correlated with itself with zero time shift and a substantially lower output level when correlated with itself with a significant time shift;

a means for transmitting said phase-modulated carrier;

a backscatter modulating means located a finite distance from said transmitting means for receiving and modulating the back-scatter of said phase-modulated carrier signal;

a means for receiving and detecting said modulated back-scattered phase-modulated carrier, said detecting means being phase-sensitive and having as a reference signal said transmitted phase-modulated carrier signal, and having as an input signal said modulated backscattered phase-modulated carrier signal, said detecting means providing an output signal whose averaged amplitude is substantially dependent upon the degree of phase correlation of the phase modulation pattern between said input signal and said reference signal; and a means for selectively processing the output signal from said detection means only when its averaged amplitude is above a threshold level, whereby only signals from a selected location are processed and the remainder being rendered incapable of being received.

2. The system of claim 1 further characterized by said phase modulating means being biphase, and said modulating signal being pseudo-random pulses.

3. The system of claim 2 further characterized by said pseudo-random pulses being generated by a shift register coupled to said modulating means.

4. The system of claim 3 further characterized by the shift rate of said shift register being substantially greater than the information signal frequency of said backscatter modulating means.

5. A system for preferentially receiving modulated backscattered signals based upon a phase shift of the modulation of the phase-modulated carrier signal resulting from the transmission-to-reception time delay, comprising:

a means for phase modulating a carrier with a pseudo-random coded sequence having characteristics which provides unity output when correlated with itself with zero time shift and a substantially lower output level when correlated with itself with a time shift of at least a significant fraction of a pulse width of said coded sequence, said modulation producing a direct sequence, spread spectrum signal;

a means for transmitting said phase-modulated carrier;

a backscatter modulating means located at a finite distance from said transmitting means for receiving and modulating the back-scatter of said phase-modulated carrier signal;

a means for receiving and detecting said modulated back-scattered phase-modulated carrier, said detecting means being phase-sensitive and having as a reference signal said transmitted phase-modulated carrier signal, and having as an input signal said modulated backscattered phase-modulated carrier signal, said detecting means providing an output signal whose averaged amplitude is substantially dependent upon the degree of phase correlation between said input signal and said reference signal; and a means for selectively processing the output signal from said receiving and detecting means only when its averaged amplitude is above a threshold level, whereby only signals from a selected location are processed and the remainder being rendered incapable of being received.

6. The system of claim 5 further characterized by the phase change rate of said coded sequence being substantially greater than the information signal frequency of said backscatter modulating means.

7. The system of claim 5 further characterized by artificially delaying one of said transmitted phase-modulated carrier reference signal or said modulated backscattered phase-modulated signal relative to the other to enhance the averaged amplitude of the detected modulated backscattered phase-modulated signal received from said backscatter modulating means given a predetermined distance between said transmitting means and said backscatter modulating means, whereby the ability to discriminate said received signal from unwanted signals is enhanced.

8. The system of claim 5 further characterized by artificially delaying one of said transmitted phase-modulated carrier reference signal or said modulated backscattered phase-modulated signal relative to the other to reduce the averaged amplitude of the detected modulated backscattered phase-modulated signal received from said backscatter modulating means given a predetermined distance between said transmitting means and said backscatter modulating means, whereby the ability to discriminate said received signal from another more desired signal is enhanced.

9. The system of claim 5 further characterized by the frequency of said pseudo-random pulse sequence being selected to enhance the averaged amplitude of the detected modulated backscattered phase-modulated signal received from said backscatter modulating means given a predetermined distance between said transmitting means and said backscatter modulating means, whereby the ability to discriminate said received signal from unwanted signals is enhanced.

10. The system of claim 5 further characterized by the frequency of said pseudo-random pulse sequence being selected to reduce the averaged amplitude of the detected modulated backscattered phase-modulated signal received from said backscatter modulating means given a predetermined distance between said transmitting means and said backscatter modulating means, whereby the ability to discriminate said received signal from another more desired signal is enhanced.

* * * * *